Figure 1:
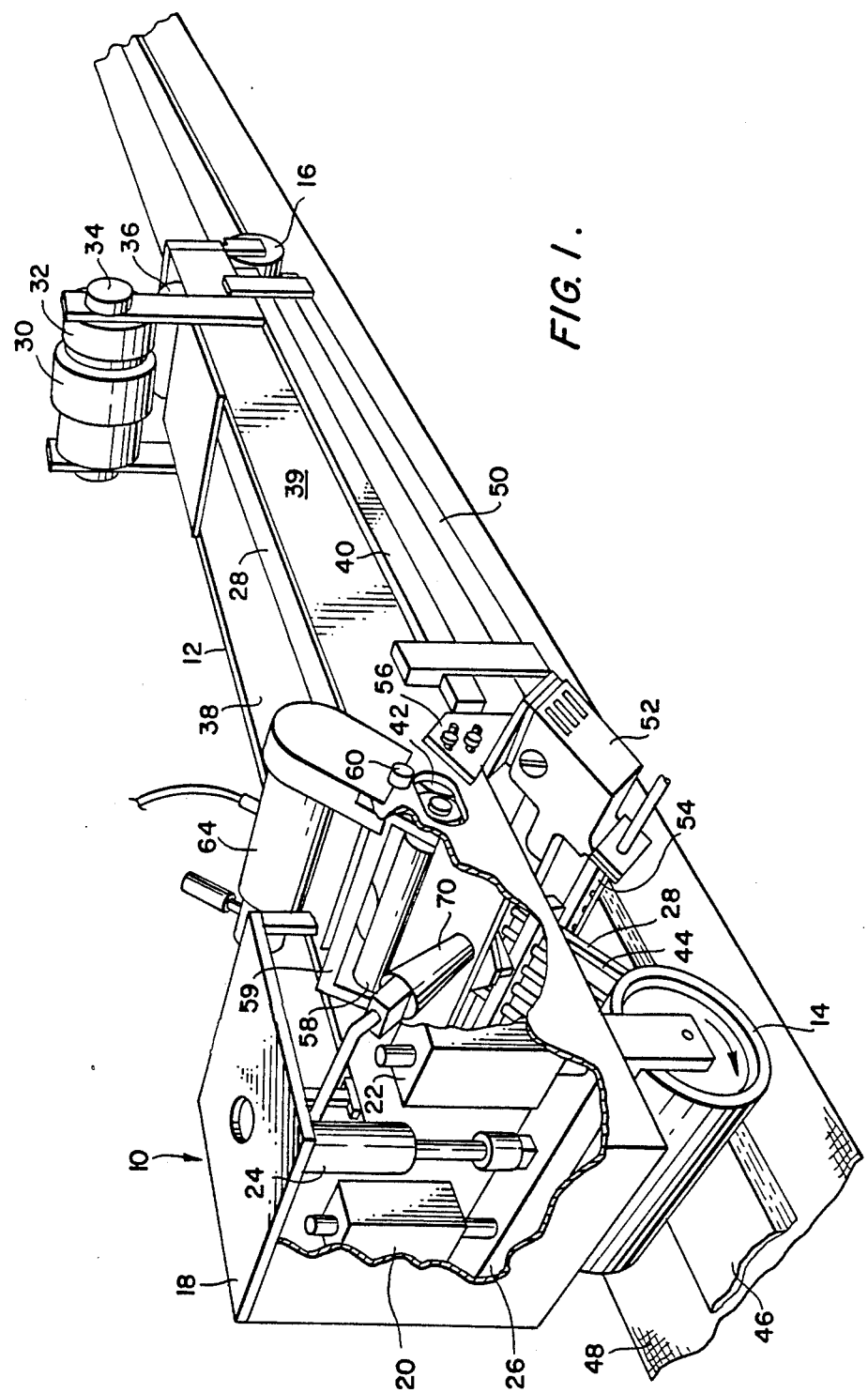

United States Patent [19]

Gruber

[11] Patent Number: 4,714,509
[45] Date of Patent: Dec. 22, 1987

[54] METHOD AND APPARATUS FOR LAYING DOWN TAPES

[75] Inventor: Mark B. Gruber, New Castle, Del.

[73] Assignee: E. I. DuPont De Nemours and Company, Wilmington, Del.

[21] Appl. No.: 626,907

[22] Filed: Jul. 2, 1984

[51] Int. Cl.$^4$ .............................................. B32B 31/26
[52] U.S. Cl. .................................... 156/272.2; 156/71; 156/160; 156/308.2; 156/309.6; 156/309.9
[58] Field of Search .................... 156/71, 82, 160, 250, 156/272.2, 272.8, 273.5, 297, 299, 302, 308.2, 309.6, 309.9, 379.6, 379.8, 380.9, 497, 510, 512, 543, 552, 554, 558, 560, 562, 574, 582, 244.17, 273.3, 304.6, 208.4, 324, 289

[56] References Cited

U.S. PATENT DOCUMENTS

| | | | |
|---|---|---|---|
| 2,220,545 | 11/1940 | Reinhardt | 18/59 |
| 2,367,725 | 1/1945 | Lindh et al. | 154/42 |
| 2,372,737 | 4/1945 | Phillips | 154/42 |
| 2,748,048 | 5/1956 | Russell | 156/289 |
| 3,038,833 | 6/1962 | Glover | 156/324 |
| 3,143,453 | 8/1964 | Huston | 156/289 |
| 3,574,040 | 4/1971 | Chitwood et al. | 156/522 |
| 3,775,219 | 11/1973 | Karlson et al. | 156/363 |
| 3,839,126 | 10/1974 | Haller | 156/497 |
| 3,843,480 | 10/1974 | Dreher | 156/324 |
| 3,974,016 | 8/1976 | Bondybey et al. | 156/222.8 |
| 4,029,535 | 6/1977 | Cannon et al. | 156/272.8 |

OTHER PUBLICATIONS

SAMPE Journal, May/Jun. 1984, vol. 20, No. 3, pp. 64 and 65; Schedule SAMPE Journal, Sept./Oct. 1984, vol. 20, No. 5, cover and pp. 32-35; Paper 2.

Primary Examiner—Donald E. Czaja
Assistant Examiner—Merrell C. Cashion, Jr.

[57] ABSTRACT

An advancing, reinforced, thermoplastic tape is pressed on a partially built, composite structure as the mating surfaces are heated to the melting point by a beam of high temperature, radiant energy. The center of the beam is directed at the structure, in advance of the nip between the tape and structure.

4 Claims, 6 Drawing Figures

METHOD AND APPARATUS FOR LAYING DOWN TAPES

BACKGROUND

Equipment for laying down and adhering successive tapes is available and in use. However, such equipment does not yield a composite structure free of voids. It has, therefore, been the practice to use tapes made with thermosetting resins which are cured as the structure is consolidated in an autoclave. The latter is a costly and time-consuming operation. Furthermore, these limitations have deprived end users of the improved properties which could be obtained from tapes made with thermoplastic resins.

SUMMARY

According to the method of the present invention, a composite structure is built from a fiber-reinforced, thermoplastic tape by advancing successive lengths of tape toward and at an angle to a work surface and pressing the advancing length, with a consolidating force, during relative movement between the two lengths. A beam of high temperature, radiant energy is directed at and across the nip between the advancing and preceding lengths of tape, with the center of the beam on the building structure. The speed of relative movement and the temperature of the radiant energy are interrelated to heat, fuse and join the thermoplastic matrices at the mating surfaces of the tapes being consolidated.

Another embodiment of the invention is a tape-laying head having means for guiding an advancing length of a reinforced, polymeric tape toward and at an angle to a building composite structure as well as a roll for pressing the advancing length on the structure. Such a head has been improved by provision of a radiant beam heater directed at the tape and structure, with the center of the beam on the structure, in advance of the nip between the tape and structure.

DRAWINGS

Figure 2:
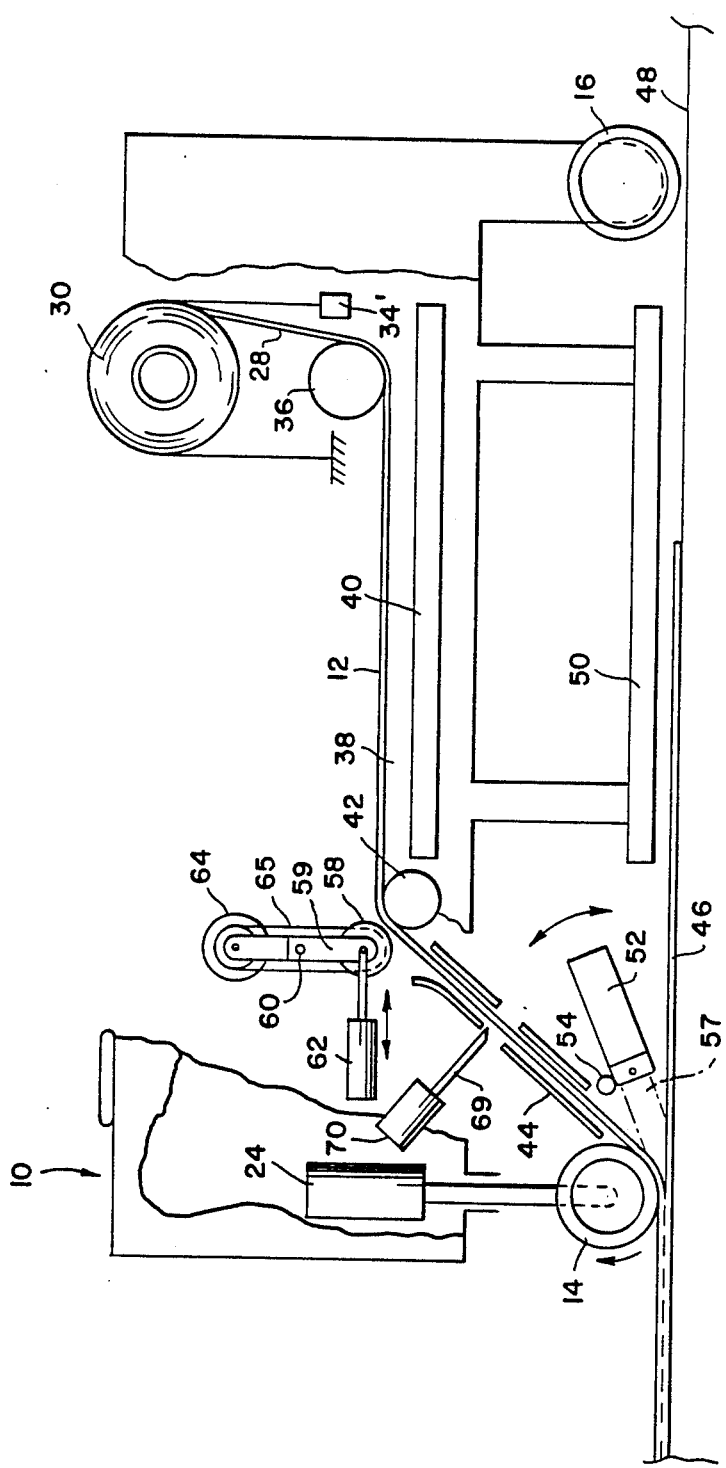
Figure 3:
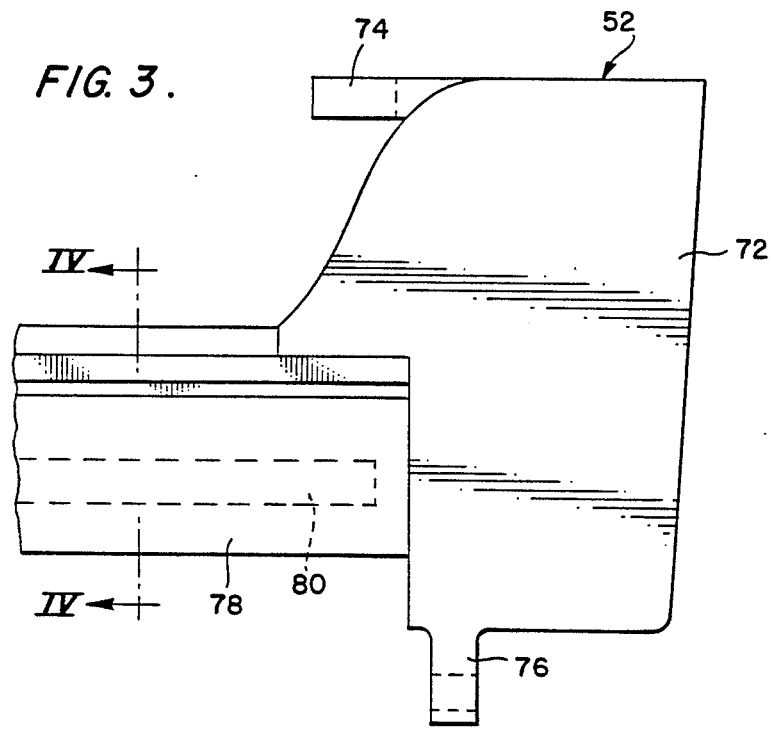
Figure 4:
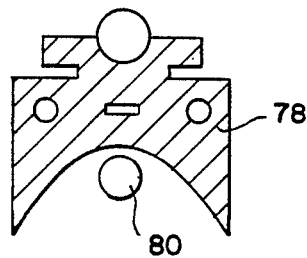
Figure 5:
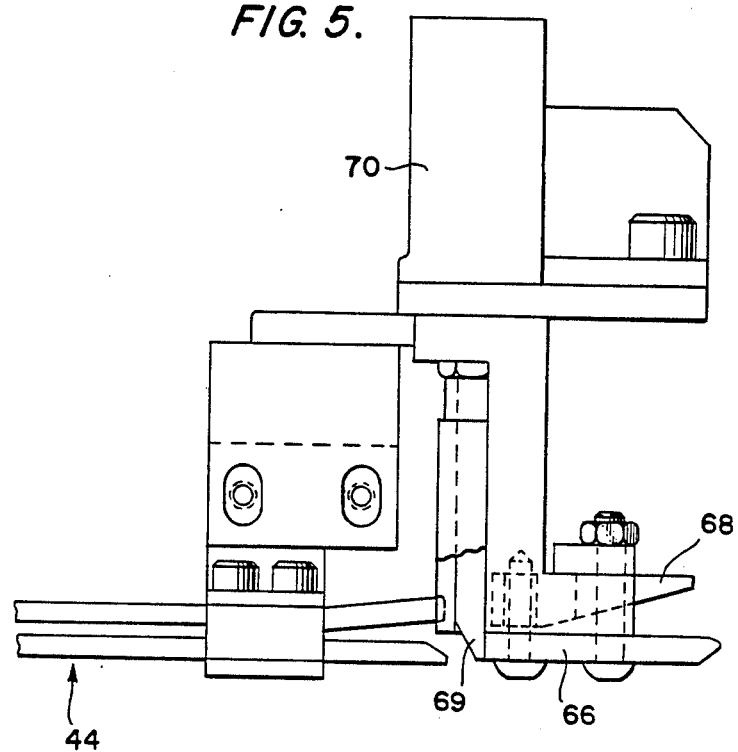
Figure 6:
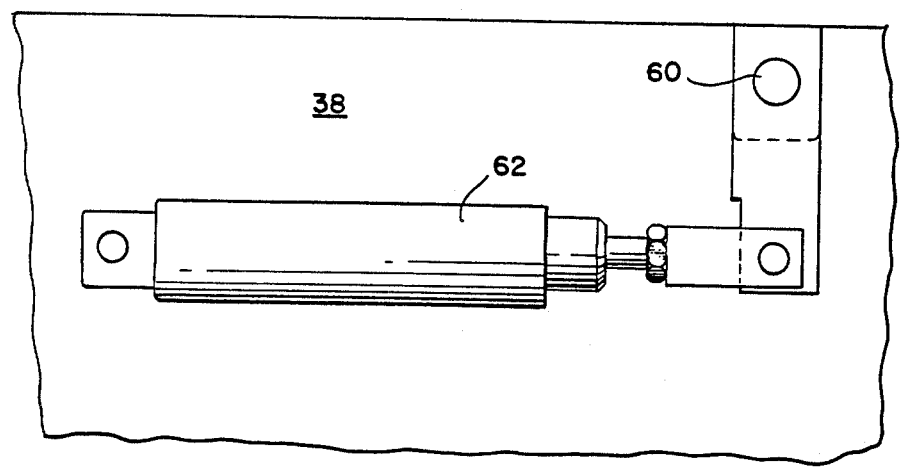

In the appended drawings,

FIG. 1 is a perspective illustration of the tape-laying head of the present invention, FIG. 2 is a schematic, side view of the head shown in FIG. 1, FIG. 3 is a fragmentary, plan view of the radiant heater shown in FIGS. 1 and 2, FIG. 4 is a cross section taken on line IV—IV in FIG. 3, FIG. 5 is a fragmentary, side view of the knife and chute shown in FIGS. 1 and 2, and FIG. 6 is a side view of one of the actuators shown in FIG. 2.

DESCRIPTION

In FIGS. 1 and 2, the tape-laying head of the present invention has been designated generally by the numeral 10 and shown to include a frame 12 provided with rollers 14, 16. The surfaces of both rollers have Teflon ® non-stick finishes. At one end, above roller 14, frame 12 supports a plate 18 which is adapted for mounting on the arm of a robot.

Parts of the frame 12 also support a pair of guide blocks 20, 22 and a piston-cylinder assembly 24. The rod of assembly 24 is attached to a yoke 26 having legs between which roller 14 is rotatably mounted. Yoke 26 also has upstanding rods which are slidable in guide blocks 20, 22.

As head 10 is moved, a fiber-reinforced, thermoplastic tape 28 is pulled from a roll 30 on a mandrel 32 against a desired level of back tension applied by a magnetic clutch 34. In the schematic of FIG. 2, the device for applying back tension has been shown as a weight 34' on a strap brake. Tape 28 advances beneath a guide roll 36, between side rails 38, 39, above a radiant preheater 40, over a roll 42, between spaced rods defining a chute 44 and beneath roller 14 which presses the advancing tape 28 on the top of a partially built composite structure 46. If the tape being laid is the first of a structure, it is pressed against a fabric 48 which has been placed on a bed or other work surface. Fabric 48 is impregnated with a non-stick finish.

As the head 10 moves with respect to partially built structure 46, the upper surface of the structure is exposed to a radiant preheater 50. However, the principal source of heat for fusing and joining the advancing tape 28 to the structure 46 is a radiant heater 52. The heater carries a manifold 54.

Heater 52 is suspended from brackets 56 which are adjustably attached to frame 12 and is positioned with a beam 57 of energy (FIG. 2) directed at tape 28 and structure 46, with the center of the beam on structure 46 in advance of the nip between between the two. It has been found that, because of heat loss to the building structure 46 through conduction, the mating surfaces can be brought to the melting point simultaneously by directing more of the radiant energy to the structure than to the advancing tape 28.

Adjacent roll 42, there is a roll 58 which is normally spaced from roll 42. Roll 58 is mounted between the dependent legs or links of a saddle 59. Saddle 59 is fixed to a shaft 60 whicn is rotatably mounted in parts of frame 12. Shaft 60 is attached to an air cylinder 62. When roll 58 is moved into engagement with a tape 28, as explained more fully hereinafter, it is driven by an air motor 64 through a belt 65. Motor 64 is attached to saddle 59 as a cantilever. As shown in FIG. 6, air cylinder 62 is located outside of rail 38.

Referring to FIGS. 1, 2 and 5, there is a gap between chute 44 and a bedknife 66. Tape 28 passes between bedknife 66 and a plate 68 and beneath a knife 69 which is attached to an air cylinder 70 by an L-shaped bracket.

As shown in FIGS. 3 and 4, heater 52 has end pieces 72 provided with ears 74 which are used to attach the heater to brackets 56 (FIG. 1) and ears 76 which mount the manifold 54. Between end pieces 72, there is a parabolic reflector 78 which focuses energy from a tubular quartz lamp 80 into the narrow beam or strip 57 of highly directional, parallel, infrared (IR) rays. The dual slot adjustment feature (FIG. 1) permits pivotal movement of heater 52 about an axis centered on lamp 80.

In an operable embodiment of the apparatus, heater 52 is a water-cooled, parallel ray, infrared Strip Heater, Model No. 5305-5A, Research Inc., Minneapolis, Minn. Quartz lamp 80 is of Type 1200 T3/CL, Research Inc., has a lighted length of six inches, and operates at a temperature of about 4000° F. at rated voltage. Magnetic clutch 34 is a Model No. HB-210, Magtrol Inc., Buffalo, N.Y.

Before start-up, a roll 30 is placed on mandrel 32 and the end of tape 28 is pulled around roll 36 and over roll 42. Air cylinder 62 is actuated to move roll 58 into engagement with the tape on roll 42. Heater 52 is energized to preheat roller 14.

Head 10 can be moved into position manually or by a manipulator attached to plate 18. If a robot is used, its movement and the various actuators disclosed herein are directed by a programmed controller.

When head 10 is in position, the desired level of force for pressing and consolidating the successive lengths of tape is applied by assembly 24. This is done by setting the air pressure to assembly 24 at a level which provides a reaction force against the manipulator and/or the weight of head 10. As soon as tape 28 reaches roller 14, roll 58 is retracted by air cylinder 62. Tension is applied to the advancing tape by magnetic clutch 34. After the proper length has been laid, roll 58 is moved into engagement with roll 42 and knife 69 is activated to cut tape 28. Head 10 continues in motion until completion of the lay-down and is then returned to the starting position where motor 64 is activated again to move tape 28 to the nip between roll 14 and structure 46. The same sequence is repeated until structure 46 has been built to the desired thickness.

Head 10 can be used with or without energization of the preheaters 40, 50, depending on its speed of advance. The principal source of heat for melting the polymeric matrices of the advancing tape 28 and the upper surface of structure 46 to a sufficient depth to achieve consolidation by roller 14 is applied by IR heater 52. For thermoplastics, it has been found that the tape and structure must be heated to the melting point through a depth of 5-20% of the thickness of a tape. Melting to a greater depth causes distortion of the structure, as well as burn-out and degradation of the matrix. As noted above, the center of the strip or beam of IR rays from the heater is directed at the building structure, in advance of the nip between tape 28 and structure 46. About 20% of the rays are directed at the lower surface of the tape 28 and about 80% are directed at the upper surface of the structure 46. With the application of pressure by roller 14, the mating surfaces are fused and a void-free, consolidated structure is built. In such a structure, the tapes lose their identity, i.e., distinct laminae are not visible to the naked eye.

The key to building a void-free consolidated structure is to bring the mating surfaces to the melting point simultaneously. Both surfaces must be melted equally or the structure will curl or otherwise distort. In tests, it has been found that the difference in temperature between the advancing tape 28 and the building structure 46 is large if the center of the IR beam is as much as 0.3 inch above the nip, with more energy directed at tape 28. The difference in temperature is only somewhat less with the center of the beam directed at the nip. Only by directing more of the IR energy to the building structure can the thermoplastic materials be brought to the melting point simultaneously. As noted above, this has been attributed to a relatively larger heat loss to the structure 46 through conduction.

Where the nature of a thermoplastic is such that heating the surface of a tape to the melting point could cause oxidation and degradation, a heated inert gas such as nitrogen is supplied to manifold 54 and floods the heated surface of the tape 28 and the structure 46.

According to the method of the present invention, a consolidated composite structure is built by advancing successive lengths of a fiber-reinforced, thermoplastic tape toward and at an angle to a work surface, pressing the advancing length against the surface of a preceding length during relative movement between the two lengths, and directing a beam of high temperature, radiant energy at and across the tape and structure, with the center of the beam on the structure, in advance of the nip between them. The speed of relative movement and the temperature of the radiant energy are interrelated to heat, fuse and join the thermoplastic matrices at the mating surfaces.

Wrinkles in the structure are avoided by advancing the tape under tension.

Movement of the first length of tape relative to the working surface can be avoided by laying it on a fabric impregnated with a non-stick finish.

As noted above, it has been found that the mating surfaces must be heated to the melting point of the thermoplastic matrix through a depth of 5-20% of the thickness of a tape. This is achieved by directing about 20% of the energy from an IR heater at the lower surface of an advancing tape and about 80% at the upper surface of the building structure. With the application of pressure to the heated tape, the mating surfaces are fused and a void-free, consolidated structure is built.

Void-free panels have been built, according to the method, from tapes reinforced with continuous, graphite filaments. In the tapes, the filaments are evenly distributed in a paperlike, continuous matrix. For the matrix, various thermoplastic polymers have been used, e.g., polypropylene, polyphenylene sulfide, an amorphous polyimide, a polyetherketone-ketone and the polyamide from bis(para-aminocyclonexyl) methane and dodecanedioic acid. A typical panel was built to a thickness of about 0.105 inch from fifteen lengths of a tape having a thickness of about 0.007 inch and a width of three inches. Aramid filaments could also be used to reinforce the tape.

Some useful and advantageous properties of the thermoplastic polymers in a composite structure are their high glass transition points, high impact resistances and high compression resistances.

What is claimed as new and desired to be secured by Letters Patent is:

1. A method of building and consolidating a composite structure from a fiber-reinforced, thermoplastic, polymeric tape, said method comprising the steps of advancing successive lengths of tape toward and at an angle to a work surface, pressing the advancing length on the preceding length, with a consolidating force, during relative movement between the two lengths, and directing a beam of high temperature, radiant energy at and across the nip between the advancing and preceding lengths of tape, with the center of the beam on the structure, heating the mating surfaces of the matrices to the melting point substantially simultaneously through 5-20% of the thickness of each tape by directing a major portion of the radiant energy at the preceding length on the building structure and the rest of the radiant energy at the advancing tape, the speed of relative movement and the temperature of the radiant energy interrelated to heat, fuse and join the thermoplastic, polymeric matrices at the mating surfaces of the tapes being consolidated.

2. The method of claim 1 comprising the preliminary step of locating a fabric impregnated with a non-stick finish on the work surface beneath the first length of tape advance thereto.

3. The method of claim 1 wherein about 20% of the radiant energy is directed at the advancing tape and the rest of the radiant energy is directed at the building structure.

4. The method of claim 3 wherein each succeeding length is advanced under tension.

* * * * *